July 15, 1941.  H. H. STYLL  2,249,061
PROJECTION DEVICE
Filed Sept. 20, 1937
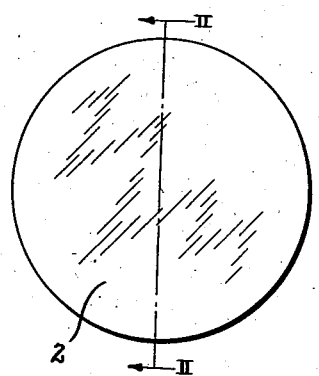
Fig. I
Fig. II
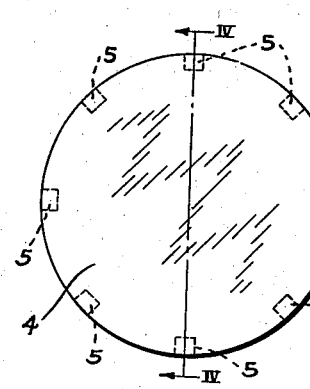
Fig. III
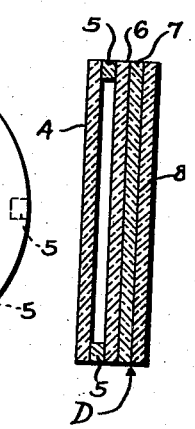
Fig. IV
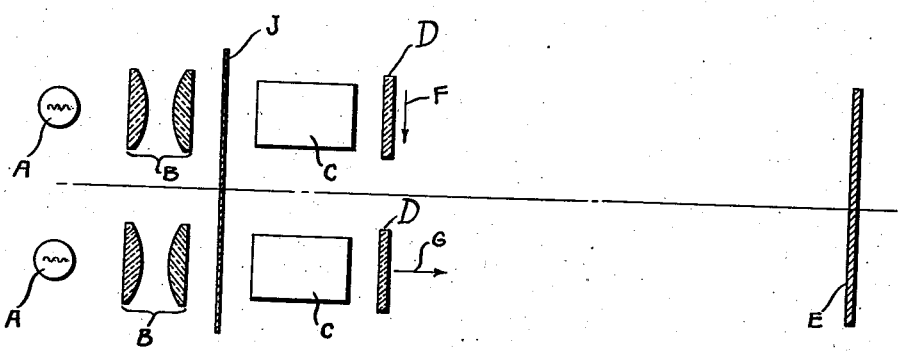
Fig. V
Fig. VI
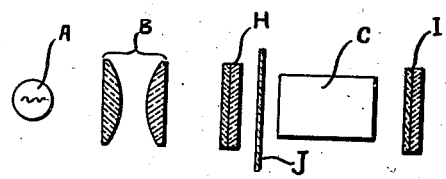
Fig. VII
INVENTOR
Harry H. Styll.

Patented July 15, 1941

2,249,061

UNITED STATES PATENT OFFICE 2,249,061

PROJECTION DEVICE

Harry H. Styll, Southbridge, Mass.

Application September 20, 1937, Serial No. 164,751

2 Claims. (Cl. 88—24)

This invention relates to improvements in projection devices and more particularly to protective and light polarizing screens for use in such devices.

A leading object of the invention is to provide a light polarizing screen for light projection devices with means of protecting said screens from destruction or deterioration by heat.

Other objects and advantages of the invention will become apparent from the following description and the accompanying drawing. It will be apparent that many changes may be made in the arrangement of parts and details of construction without departing from the spirit of the invention as expressed in the following claims as the preferred forms only have been shown and described by way of illustration. I, therefore, do not wish to be confined to the exact details shown and described.

Referring to the drawing:

Fig. I is a face view of a portion of a screen embodying the invention;

Fig. II is a cross section on line II—II of Fig. I;

Fig. III is a face view of a complete screen embodying the invention;

Fig. IV is a cross section on line IV—IV of Fig. III;

Fig. V is a diagrammatic representation of a stereoscopic light projector showing a screen located in the projection system;

Fig. VI is a diagrammatic view illustrating the plane of polarization of viewing spectacles to be used in viewing the projected images of Fig. V; and Fig. VII is a diagrammatic view of a light projection system showing a screen in place therein.

There has lately come into use the projection of stereoscopic images on a screen, such as moving pictures wherein a light polarizing film is utilized in the light projecting system to properly merge the images on the screen when viewed by eyes having polarized elements therein. The polarizing effect is obtained by means of a sheet of composition film in which is embedded a mass of light polarizing crystals with their axes oriented in parallelism. This film, like the picture film of a moving picture projector is subject to deterioration or destruction by the heat produced by the projecting light. It is, therefore, a principal object of the invention to provide light transmitting means that will reduce this heat to a point where the polarizing film will not be injured or destroyed by the heat.

Referring to the drawing, wherein similar reference characters represent similar parts throughout: I have illustrated in the diagram of Fig. V a stereoscopic motion picture projection system wherein A is the source of light, usually an electric light or lamp, B is the condenser lens system, C the projection lens system, and D the light polarizing screen, while E is the viewing screen or sheet onto which the images are projected, and J is the film.

In the upper projection system of Fig. V the light polarizer D polarizes the light in the plane represented by the arrow F, while in the lower projection system the light is polarized in the plane indicated by the arrow G.

In Figs. I and II, I have produced a polarizer protective screen D wherein a layer 1 of clear optical glass is coated with a metallic layer 2 which has the property of reflecting the heat rays, or infra-red rays and transmitting the rays of the visible spectrum. From experience I have found that gold is the preferable metal with which to coat the glass layer 1, although other metals possess the same property.

In Figs. III and IV, I have shown another form of protective polarizing screen in which 4 is a layer of glass containing in its composition ferrous iron, which glass has the property of absorbing the heat or infra-red rays of light. This may be made of the commercial glass known as Calobar which has a greenish tint, or of a white glass containing ferrous iron as set forth in application for United States Letters Patent, filed May 15, 1936, Serial No. 79,960, by E. D. Tillyer et al. Over the inner surface of the layer 4, I place an air spacer member 5 comprising a plurality of separated spacer pieces or blocks arranged around the margin or edge of the layer 4. Supported by the air spacers 5 is a second layer of glass, 6, preferably white and clear. Over the layer 6 is placed a polarizer film 7, of a Polaroid material made as set forth in U. S. Patent No. 1,918,848 dated July 18, 1933, to Land et al., and over this another layer 8 of clear glass. The polarizer layer 7 is secured to the glass layers 6 and 8 adhesively or by pressure, or both. The spacers 5 are also adhesively secured in a preferred form to the layers 4 and 6. The device as shown in Figs. III and IV produces a composite protective and polarizing screen.

The protective unit of Fig. II may be substituted for the protective unit of the assembly of Fig. IV and said assemblies may be placed at D in the projection system. These protective polarizing means may be produced as units, as shown in Fig. IV, or the protective part may be separated from the polarizing part and the heat protecting part placed at H, Fig. VII, and the polarizing part at I, Fig. VII. These screens may be placed as a unit in various places in the projection system, but the heat part should be placed nearest the light source.

In operation the glass heat screen part either reflects or absorbs the heat rays and transmits the visible rays. The polarizing screen polarizes the light in the selected planes.

In use the stereoscopic images are projected through the projector system and the light polarized in desired plane and the fragile light polarizer protected by the heat retarding member.

The images are viewed on the screen through spectacle-like means having light polarizers that polarize the light in the desired plane as indicated in Fig. VI. The practical result of such projection used in combination with polarizers before the eyes is to produce the effect of depth in the images seen on the viewing screen, thus overcoming the flat appearance of projected images usual in the past.

From the foregoing it will be seen that I have provided simple, efficient and inexpensive means for obtaining all the objects and advantages of the invention.

Having described my invention, I claim:

1. A light altering unit for use with a projection system for projecting a beam of light, said unit comprising a layer of a relatively thin solid body of transparent material embodying means for retarding infra-red rays supported in air spaced and substantially parallel aligned relation with a light polarizing assembly, said assembly comprising a relatively thin light polarizing film susceptible to heat injury supported by a transparent plate and spacer members secured between said infra-red retarding layer and said polarizing assembly with said spacer members in spaced relation with each other so as to enable circulation of air between said infra-red retarding layer and said polarizing assembly, said light altering unit being adapted to be positioned in said projected beam of light so that said beam has to traverse said infra-red retarding layer prior to traversing said relatively thin light polarizing film whereby the material of said film is protected from heat injury through the air spaced relation of the infra-red retarding layer and the polarizing assembly and through the heat retarding characteristics of the infra-red retarding layer prior to the heat rays reaching the relatively thin light polarizing film and said light altering unit being so positioned in said beam that the polarizing axis of the film will be oriented in the proper direction to control the axis of polarization of the light traversing said light altering unit.

2. A light altering unit for use with a projection system for projecting a beam of light, said unit comprising a layer of a relatively thin solid body of transparent material having a heat retarding coating on one side thereof for retarding infra-red rays supported in air spaced and substantially parallel relation with a light polarizing assembly, said assembly comprising a relatively thin light polarizing film susceptible to heat injury supported between transparent plates and spacer members secured between said infra-red retarding layer and said polarizing assembly with said spacer members in spaced relation with each other so as to enable circulation of air between said infra-red retarding layer and said polarizing assembly, the said light altering unit being adapted to be positioned in said projected beam of light so that said beam has to traverse said infra-red retarding layer prior to traversing said relatively thin sheet polarizing film whereby the material of said film is protected from heat injury through the air spaced relation of the infra-red retarding layer and the polarizing assembly and through the heat retarding characteristics of the infra-red retarding layer prior to the heat rays reaching the relatively thin light polarizing film and said light altering unit being so positioned in said beam that the polarizing axis of the film will be oriented in the proper direction to control the axis of polarization of the light traversing said light altering unit.

HARRY H. STYLL.